G. A. QUIN.
COUPLING.
APPLICATION FILED FEB. 24, 1913.

1,109,016.

Patented Sept. 1, 1914.

Witnesses.
L. Chewright
E. P. Hall.

Inventor
George A. Quin
by
J. Edward Maybee
atty

UNITED STATES PATENT OFFICE.

GEORGE A. QUIN, OF TORONTO, ONTARIO, CANADA.

COUPLING.

1,109,016.　　　Specification of Letters Patent.　　Patented Sept. 1, 1914.

Application filed February 24, 1913. Serial No. 750,352.

*To all whom it may concern:*

Be it known that I, GEORGE A. QUIN, of the city of Toronto, in the Province of Ontario, Canada, have invented certain new and useful Improvements in Couplings, of which the following is a specification.

This invention relates particularly to couplings used for connecting sectional rods such as used for pushing electric wires and cables through conduits, and my object is to devise a coupling which while secure is readily coupled and uncoupled, has interchangeable parts and possesses a certain amount of flexibility.

I attain my object by means of the construction hereinafter described and illustrated in the accompanying drawing in which—

Figure 3:
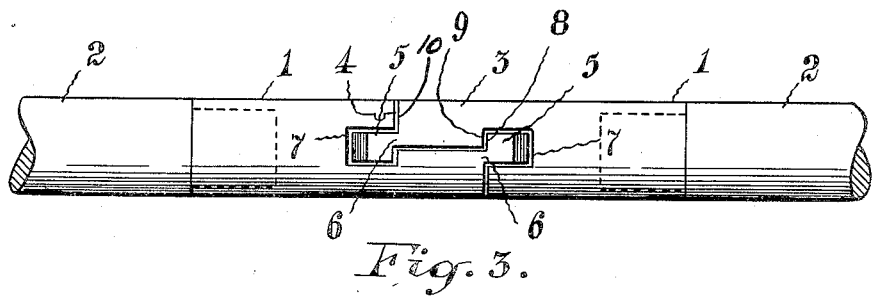
Figure 2:
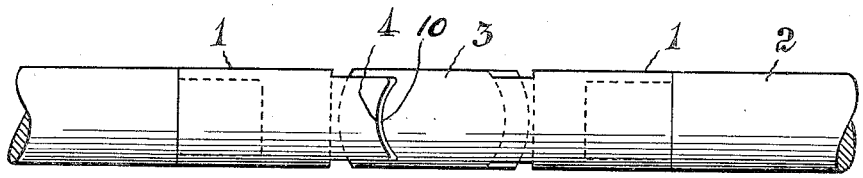
Figure 1:
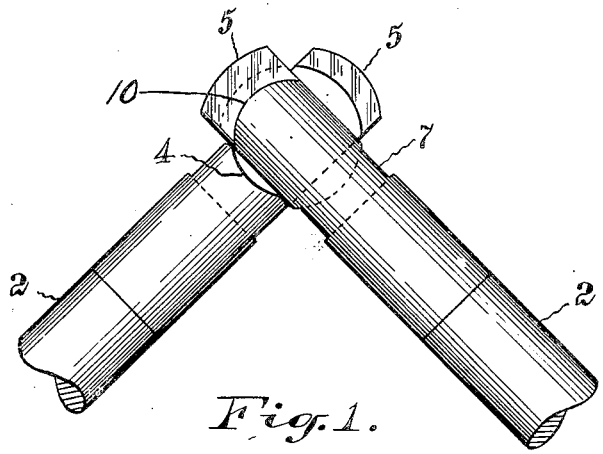

Figure 1 is a plan view showing the parts in position for coupling or uncoupling; Fig. 2 a plan view showing the parts coupled and in alinement, and Fig. 3 a side elevation showing the parts in the same position as in 2.

In the drawings like numerals of reference indicate corresponding parts in the different figures.

The coupling comprises two parts, each identical in form, so that the parts are always interchangeable. Each part comprises a body 1, formed with a socket as indicated in dotted lines to receive the end of the rod 2 or other part to be coupled. The end of the body is reduced to a thickness of one half of that of the body itself, this projecting portion 3 thus leaving a shoulder 4 on the end of the body. At the end of the projecting portion 3 is formed the head 5 the thickness of which is disposed equally on each side of the plane of the face of the projecting portion 3. The head is thus connected with the body portion merely by the neck 6. In the body portion is formed a socket 7 adapted to receive the head 5 of the other half of the coupling.

As it is my object to arrange the coupling so that it may be disengaged only when the parts are at an angle to one another, as shown in Fig. 1, the inwardly directed face 8 of the head and the corresponding face 9 of the socket are curved substantially on arcs of the same circle, this circle being struck from a center at the middle of the coupling. When the coupling is in the position, shown in Figs. 2 and 3, the curved faces of the heads and sockets engage to resist tensional strains tending to separate the parts. At the same time the parts are readily engaged and disengaged by turning them to or from the position shown in Fig. 1. To resist compression strains the shoulders 4 are curved similarly to the faces 8 and 9 and the ends 10 of the projecting portions 3 are also similarly curved to engage with them.

The sockets 7 need not closely fit the ends of the heads 5, but as it is preferable not to leave too much open space I make them a fairly snug fit to the ends of the heads. The ends of the sockets are preferably straight, as shown, while the ends of the heads are curved concentric with the curves of the faces 8 and 9 to facilitate the heads entering the sockets when the couplings are engaged by a rocking movement as described.

The coupling, it will be seen, possesses many advantages. The parts are interchangeable so that either end of any rods or other parts to be coupled may be engaged with either end of any other rod or part to be coupled. When engaged the action is quite secure. At the same time a certain amount of lateral flexibility is provided which is useful when the rods have to pass around slight curves. The construction is also quite cheap as the parts may be cast and very little grinding and no machine work is required to make them fit.

What I claim as my invention is:—

1. A coupling formed of similar parts each comprising a body portion, a projecting portion of half the thickness of the body, a head at the end of the projecting portion having its thickness disposed equally on each side of the plane of the face of the projecting portion, and a socket formed in the body adjacent the projecting portion to receive the head of the other part of the coupling, the inwardly directed face of the head and the corresponding face of the socket being curved substantially on arcs of the same circle struck from a center at the middle of the coupling.

2. A coupling formed of similar parts each comprising a body portion, a projecting portion of half the thickness of the body, a head at the end of the projecting portion having its thickness disposed equally on each side of the plane of the face of the projecting portion, a socket formed in the body adjacent the projecting portion to receive the head of the other part of the coupling, the inwardly directed face of the head and the corresponding face of the socket being curved substantially on arcs of the same circle struck from a center at the middle of the coupling, and the faces at the end of the projecting portion and the shoulder of the body portion also being curved on arcs of the same circle concentric with the faces of the head and socket hereinbefore referred to.

3. A coupling formed of similar parts each comprising a body portion, a projecting portion of half the thickness of the body, a head at the end of the projecting portion having its thickness disposed equally on each side of the plane of the face of the projecting portion, a socket formed in the body adjacent the projecting portion to receive the head of the other part of the coupling, the inwardly directed face of the head and the corresponding face of the socket being curved substantially on arcs of the same circle struck from a center at the middle of the coupling, the faces at the end of the projecting portion and the shoulder of the body portion also being curved on arcs of the same circle concentric with the faces of the head and socket hereinbefore referred to, and the face of the outer end of the head also being curved concentric with the curves hereinbefore referred to.

4. A coupling formed of similar parts each comprising a body portion, a projecting portion of half the thickness of the body, a head at the end of the projecting portion having its thickness disposed equally on each side of the plane of the face of the projecting portion, a socket formed in the body adjacent the projecting portion to receive the head of the other part of the coupling, the inwardly directed face of the head and the corresponding face of the socket being curved substantially on arcs of the same circle struck from a center at the middle of the coupling, the faces at the end of the projecting portion and the shoulder of the body portion also being curved on arcs of the same circle concentric with the faces of the head and socket hereinbefore referred to, the face of the outer end of the head also being curved concentric with the curves hereinbefore referred to and the face of the inner wall of the socket being flat.

Toronto, this 18 day of Feb. 1913.

GEORGE A. QUIN.

Signed in the presence of—
J. EDW. MAYBEE,
D. S. TOVELL.